( 12 ) United States Patent
Barefoot et al.

(10) Patent No.: US 7,200,300 B2
(45) Date of Patent: Apr. 3, 2007

(54) LENSED FIBERS AND METHODS OF MAKING LENSED FIBERS

(75) Inventors: Kristen L. Barefoot, Bath, NY (US); G. Scott Glaesemann, Corning, NY (US); John R. Saltzer, Jr., Beaver Dams, NY (US); Nagaraja Shashidhar, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 34 days.

(21) Appl. No.: 10/930,492

(22) Filed: Aug. 31, 2004

(65) Prior Publication Data

US 2005/0152644 A1 Jul. 14, 2005

Related U.S. Application Data

(60) Provisional application No. 60/536,665, filed on Jan. 14, 2004.

(51) Int. Cl.
*G02B 6/32* (2006.01)

(52) U.S. Cl. .......................................... 385/33; 385/38

(58) Field of Classification Search ..................... None
See application file for complete search history.

(56) References Cited

U.S. PATENT DOCUMENTS

| | | | | |
|---|---|---|---|---|
| 5,100,507 A * | 3/1992 | Cholewa et al. | ............... | 216/24 |
| 5,459,803 A | 10/1995 | Yamane et al. | ............... | 385/33 |
| 6,549,704 B2 | 4/2003 | Ukrainczyk | ............... | 385/33 |
| 6,556,747 B2 * | 4/2003 | Ouali et al. | ............... | 385/33 |
| 6,594,419 B2 | 7/2003 | Ukrainczyk et al. | ............... | 385/33 |
| 6,596,394 B2 | 7/2003 | Toler et al. | ............... | 428/392 |

OTHER PUBLICATIONS

U.S. Appl. No. 09/812,108, filed Jan. 24, 2001, Bhagavatula et al.
U.S. Appl. No. 09/919,139, filed Feb. 6, 2003, Ukrainczyk.
U.S. Appl. No. 10/170,762, filed Mar. 20, 2003, Ukrainczyk et al.
U.S. Appl. No. 10/202,515, filed Sep. 4, 2003, Bhagavatula et al.
U.S. Appl. No. 10/202,576, filed Feb. 6, 2003, Nobbio.
U.S. Appl. No. 10/319,748, filed Dec. 13, 2002, Terry Taft.
U.S. Appl. No. 10/202,562, filed Sep. 4, 2003, Bhagavatula et al.
U.S. Appl. No. 10/699,450, filed Jul. 1, 2004, Bhagavatula et al.
U.S. Appl. No. 60/442,150, filed Jan. 23, 2003, Ljerka Ukrainczyk.
U.S. Appl. No. 60/437,253, filed Dec. 30, 2003, Ian Crosby.

* cited by examiner

*Primary Examiner*—Sung Pak
*Assistant Examiner*—Jerry T. Rahll
(74) *Attorney, Agent, or Firm*—Timothy M. Schaeberle

(57) ABSTRACT

The present invention provides lensed fibers and methods of making lensed fibers. According to one embodiment of the invention, a method of making a functional-coated lensed fiber includes the steps of providing a lensed fiber, the lensed fiber having a terminal section including a terminal fiber segment and a lensed segment, the lensed segment having an optically operative area; covering at least part of the terminal section of the lensed fiber with a protective element, thereby forming a protected lensed fiber having an optically operative area that is not covered by the protective element; and forming a functional coating on the optically operative area of the lensed segment of the protected lensed fiber to form the functional-coated lensed fiber. The method can be used to provide antireflection coated lensed fibers that are resistant to breakage.

18 Claims, 5 Drawing Sheets

LENSED FIBERS AND METHODS OF MAKING LENSED FIBERS

CROSS-REFERENCE TO RELATED APPLICATIONS

The present application claims the priority under 35 U.S.C. § 119(e) of U.S. Provisional Patent Application Ser. No. 60/536,665, entitled "LENSED FIBERS AND METHODS OF MAKING LENSED FIBERS," filed Jan. 14, 2004, which is hereby incorporated herein by reference in its entirety.

BACKGROUND OF THE INVENTION

1. Field of the Invention

The present invention relates generally to methods and devices for coupling light between optical fibers and optical devices in optical communications networks. More specifically, the invention relates to lensed fibers for focusing and collimating applications, and methods of making lensed fibers.

2. Technical Background

Light emerges from the end of an optical fiber in the form of a diverging beam. In collimating applications, a lens is used to convert this diverging beam into a substantially parallel beam. If the light is subsequently to be re-launched into another optical fiber, another lens operating in the reverse sense will be needed. In focusing and condenser applications, a lens is used to convert the diverging beam to a converging beam. In general, the lens must be properly coupled to the optical fiber to achieve efficient conversion of the diverging beam to either a substantially parallel beam or a slightly converging beam. One method for coupling the lens to the optical fiber is based on a fusion process. In this method, a planoconvex lens is formed on the end of an optical fiber (e.g. by fusion splicing) to form a monolithic device called a lensed fiber.

Lensed fibers are advantageous because they do not require active fiber-to-lens alignment and/or bonding of fiber to lens, they have low insertion loss, and they enable device miniaturization and design flexibility. Lensed fibers are easily arrayed and are therefore desirable for making arrayed devices, such as variable optical attenuators and optical isolators, for use in silicon optical bench applications, for use as high power connectors and dissimilar fiber connectors, and for coupling optical signals into other micro-optic devices. The beam emerging from the lensed fiber typically has a substantially Gaussian profile. Further, the beam diameter and working distance can be tailored to application specifications.

The lensed end of a lensed fiber is often coated with a functional coating in order to provide desired properties at the terminal lens interface. For example, the lensed end of a lensed fiber may be coated with an anti-reflective coating to reduce losses due to reflection at the terminal lens interface. Lensed fibers are assembled in optical devices, and must be sufficiently robust to survive handling during assembly, as well as during deployment and operation. There is desired a functionally coated lensed fiber having both improved strength and acceptable reflection loss.

SUMMARY OF THE INVENTION

One embodiment of the present invention relates to a method of making a functional-coated lensed fiber, the method including the steps of providing a lensed fiber, the lensed fiber having a terminal section including a terminal fiber segment and a lensed segment, the lensed segment having an optically operative area; covering at least part of the terminal section of the lensed fiber with a protective element, thereby forming a protected lensed fiber having an optically operative area that is not covered by the protective element; and forming a functional coating on the optically operative area of the lensed segment of the protected lensed fiber to form the functional-coated lensed fiber.

Another embodiment of the present invention relates to lensed fiber having an optically operative area, the optically operative area having a functional coating formed thereon, the lensed fiber having an average pull strength of greater than 40 kpsi.

Another embodiment of the present invention relates to functional-coated lensed fiber comprising a terminal section including a terminal fiber segment and a lensed segment, the lensed segment having an optically operative area, the optically operative area having an functional coating formed thereon, wherein at least part of the terminal section of the lensed fiber is covered with a protective element, and wherein the optically operative area of the lensed segment is not covered by the protective element.

The devices and methods of the present invention result in a number of advantages over prior art devices and methods. For example, the present invention allows the formation of antireflection-coated lensed fibers having high pull strengths and protection against handling-induced damage.

Additional features and advantages of the invention will be set forth in the detailed description which follows, and in part will be readily apparent to those skilled in the art from the description or recognized by practicing the invention as described in the written description and claims hereof, as well as in the appended drawings.

It is to be understood that both the foregoing general description and the following detailed description are merely exemplary of the invention, and are intended to provide an overview or framework for understanding the nature and character of the invention as it is claimed.

The accompanying drawings are included to provide a further understanding of the invention, and are incorporated in and constitute a part of this specification. The drawings are not necessarily to scale, and sizes of various elements may be distorted for clarity of explanation. The drawings illustrate one or more embodiment(s) of the invention and together with the description serve to explain the principles and operation of the invention.

DETAILED DESCRIPTION OF THE PREFERRED EMBODIMENTS

Figure 1:
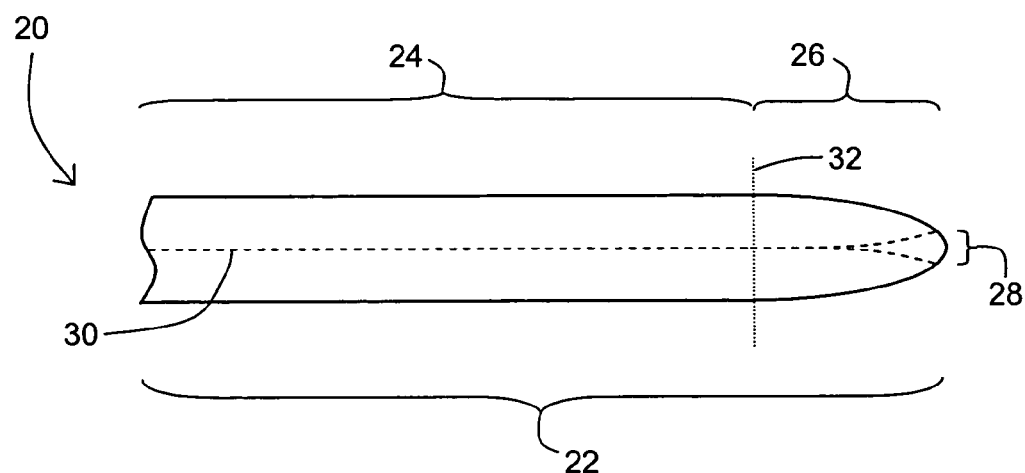
FIG. 1 is a schematic view of a lensed fiber.
Figure 2:
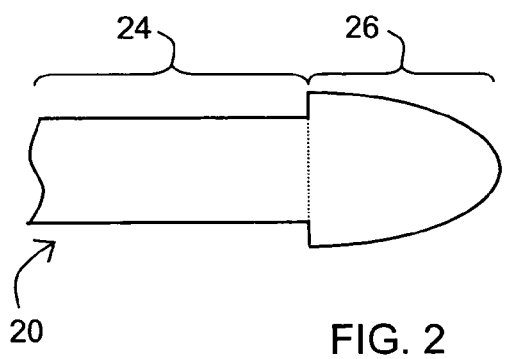
FIGS. 2–6 are schematic views of examples of lensed fibers.
Figure 3:
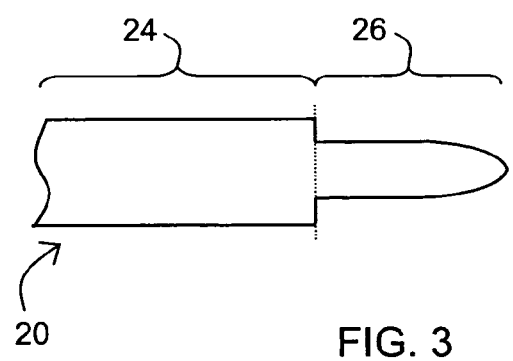
Figure 4:
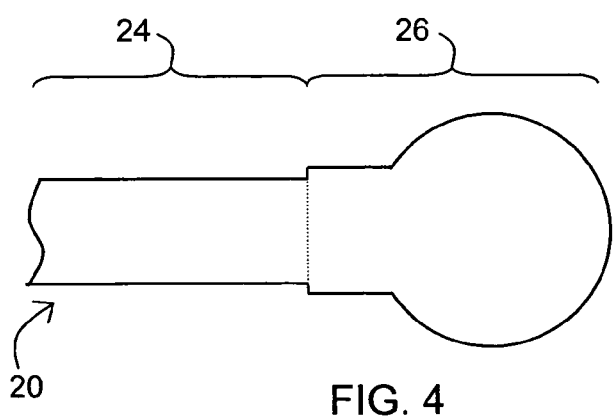
Figure 5:
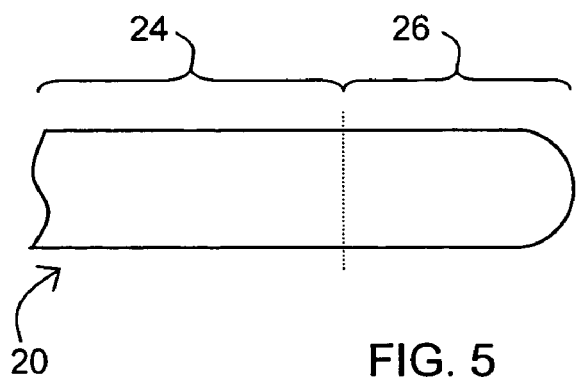
Figure 6:
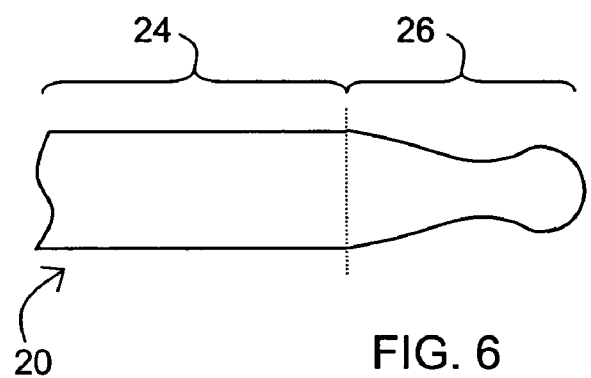

A schematic view of an example of a lensed fiber is shown in schematic view in FIG. 1. Lensed fiber 20 includes terminal section 22, which includes terminal fiber segment 24 and lensed segment 26. Lensed segment 26 includes optically operative area 28, where the light propagating through the lensed fiber (indicated by dashed line 30) interacts with the surface of lensed segment 26. Lensed segment 26 may have substantially the same diameter as terminal fiber segment 24, as shown in FIG. 1. Alternatively, lensed segment 26 may be larger in diameter than terminal fiber segment 24, as shown in FIG. 2; or smaller in diameter than terminal fiber segment 24, as shown in FIG. 3. Lensed segment 26 may be formed, for example, as a tapered lens; a ball lens, as shown in FIG. 4; a semispherical lens, as shown in FIG. 5; a "bullet" lens, as shown in FIG. 1; or a "bowling pin" lens as shown in FIG. 6. Examples of suitable lensed fibers and procedures for making lensed fibers may be found in U.S. patent application Ser. Nos. 09/812,108; 09/919,139; 10/170,762; 10/202,515; 10/202,516; 10/319,748; 10/202,562; 10/699,450 and 60/442,150; and U.S. Pat. Nos. 6,594,419 and 6,549,704, each of which is hereby incorporated herein by reference in its entirety. Suitable lensed fibers are available from Corning Incorporated under the trade name OptiFocus™ Lensed Fibers.

The present inventors have determined that handling during manufacturing and shipping, and conventional functional coating techniques tend to reduce the strength of lensed fibers. For example, when lensed fibers having a tapered lens design were ultrasonically cleaned and e-beam coated with a multilayer $SiO_2/HfO_2$ antireflection coating, the pull strength was reduced from about 200 kpsi to about 10 kpsi. The antireflection coated lensed fibers were susceptible to breakage during subsequent packaging operations (e.g., fitting with ferrules).

Figure 7:
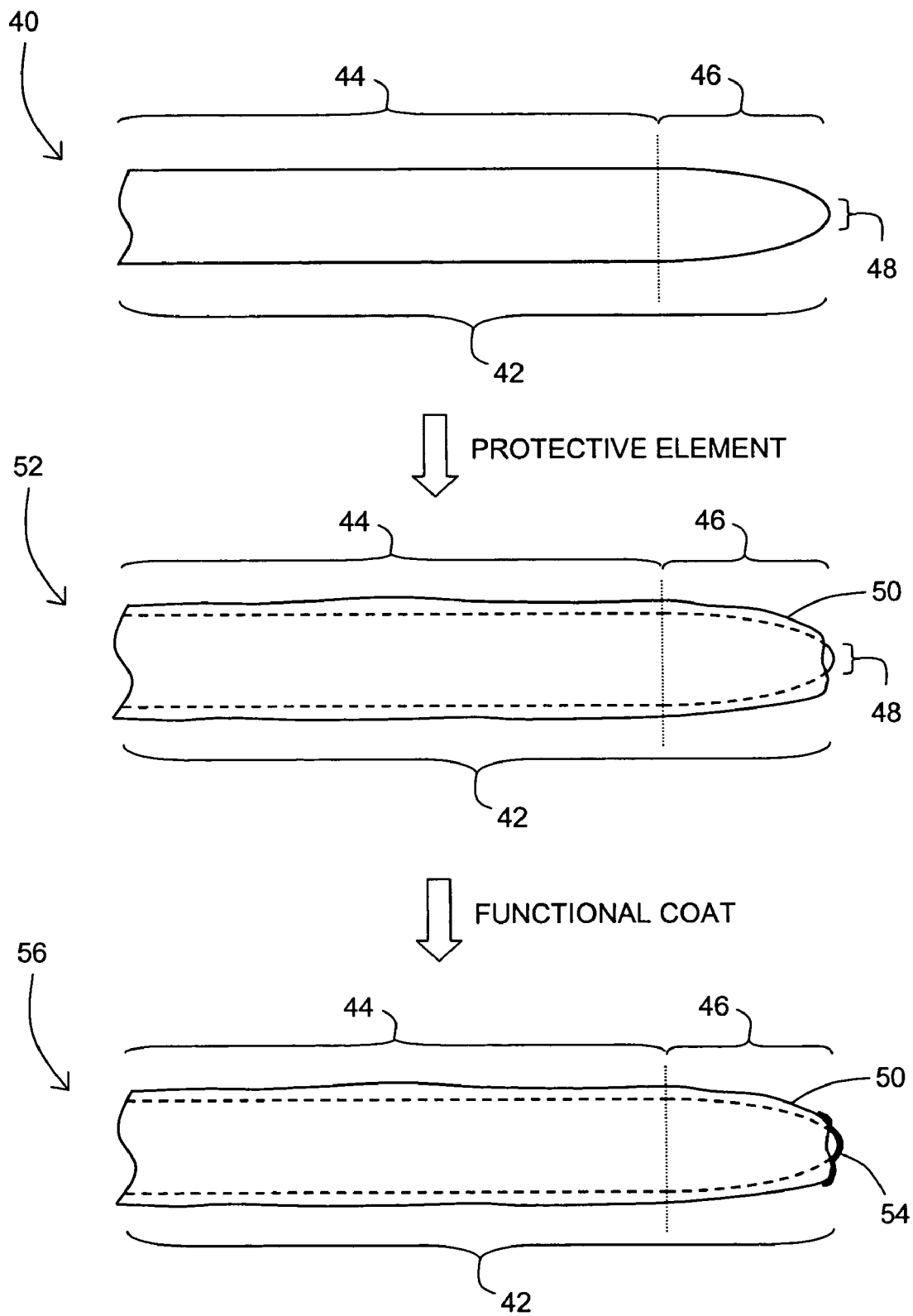
FIG. 7 is a schematic view of an example of a method of the present invention.

One embodiment of the present invention relates to a method for making a functional-coated lensed fiber. An example of a method of the present invention is shown in schematic view in FIG. 7. A lensed fiber 40 is provided. Lensed fiber 40 has a terminal section 42, which includes terminal fiber segment 44 and lensed segment 46, which has an optically operative area 48. At least part of terminal section 42 of lensed fiber 40 is covered with a protective element 50, thereby forming protected lensed fiber 52. The protective element 50 is formed so that the optically operative area 48 is not coated. The protective element is desirably formed so that it does not obstruct the optically operative area during subsequent cleaning and functional coating steps. The protective element may be initially formed so that it does not obstruct the optically operative area, or alternatively can be initially formed so that it partially or totally covers the optically operative area, then removed in the neighborhood of the optically operative area. Similarly, the protective element is desirably formed so that it does not obstruct the optically operative area during use of the lensed fiber. Functional coating 54 is formed on the optically operative area 48 of lensed segment 46, thereby forming the functional-coated lensed fiber 56.

Figure 8:
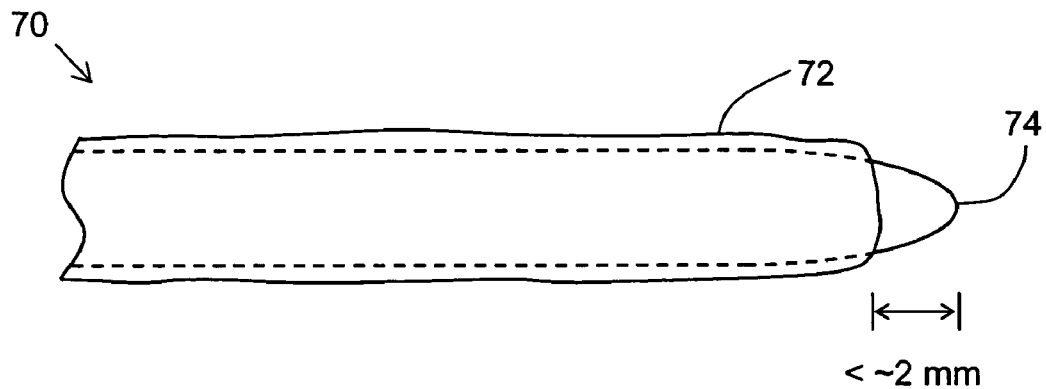
FIG. 8 is a schematic view of a lensed fiber partially covered with a protective element for use in the present invention.
Figure 10:
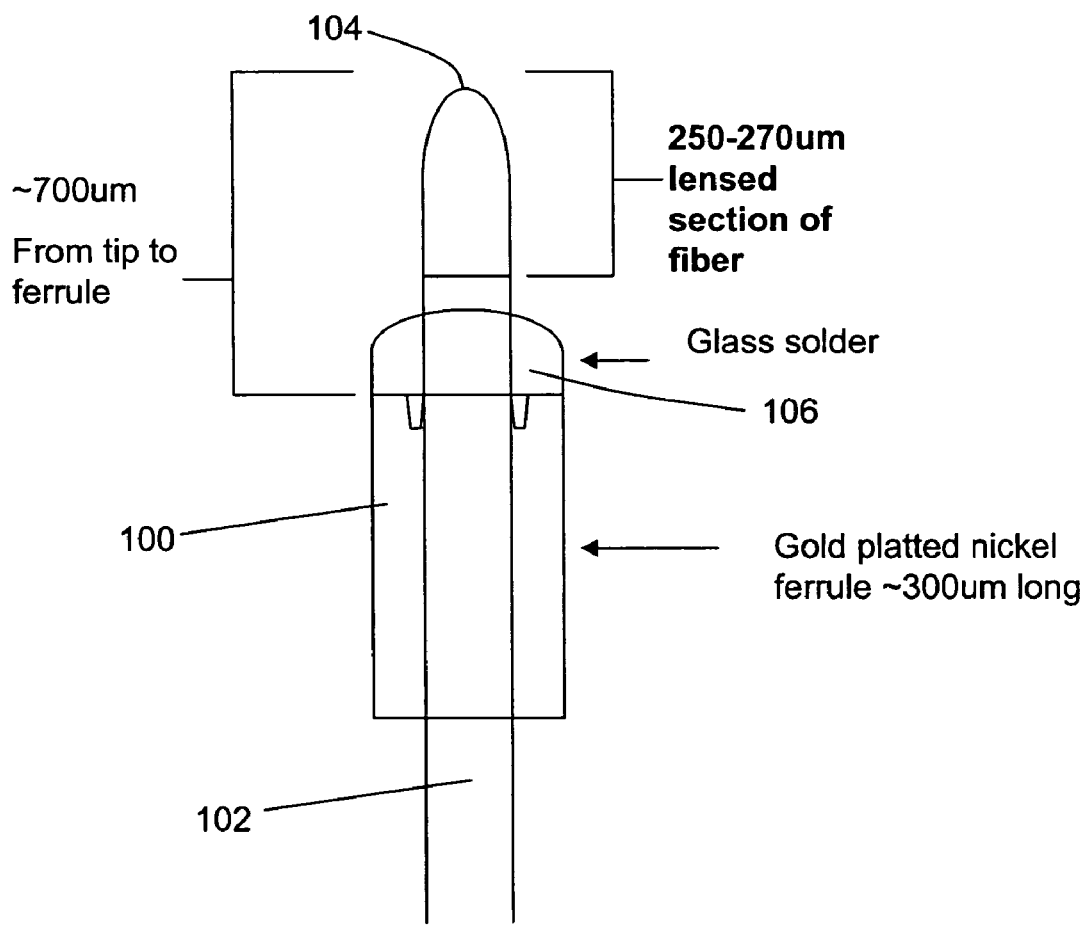
FIG. 10 is a schematic view of a ferruled lensed fiber for use in a pull strength test.

The protective element protects a significant part of the exposed glass surface of the lensed fiber from the weakening effects of functional coating deposition and handling. Desirably, only the neighborhood of the optically operative area is exposed directly to the functional coating conditions. For example, in one embodiment of the invention shown in FIG. 8, the protective element 72 extends to within no greater than about 2 mm of the lensed tip 74 of the lensed fiber 70. Desirably, the protective element extends to within no greater than about 1 mm of the lensed tip of the lensed fiber. More desirably, the protective element extends to within no greater than about 0.5 mm of the lensed tip of the lensed fiber. To provide protection during handling, it may be desirable to form the protective element back to where the optical fiber coating of the lensed fiber ends. However, in some embodiments of the invention, it is only necessary to form the protective element on areas of the lensed fiber that will be exposed to the damaging conditions in the cleaning and functional coating steps. Any overspray from the functional coating process can land on the protective element, and therefore not damage the glass surface of the lensed fiber.

It is desirable to cover at least part of the terminal section of the lensed fiber with the protective element substantially immediately after the lensed fiber is produced (e.g., immediately after the lens is formed on the end of the optical fiber). For example, it is desirable that no substantial process steps intervene between the production of the lensed fiber and the step of covering at least part of the terminal section of the lensed fiber with the protective element (other than steps taken in preparation for the step of covering at least part of the terminal section).

In order to improve the adhesion of the functional coating, it may be desirable to perform a cleaning step on at least the optically operative area of the lensed segment of the lensed fiber. Since the cleaning step may also potentially weaken the lensed fiber, it is desirable to perform this cleaning step on the protected lensed fiber. The cleaning step may be, for example, an ultrasonic cleaning; the skilled artisan will envision other suitable cleaning methods, depending on the identity of the protective element and the type of functional coating being used.

In many of the procedures used to form lensed fibers, the lensed segment is formed by splicing material (e.g. glass rod, multimode fiber) onto the terminal fiber segment. In such procedures, the interface (32 in FIG. 1) between the lensed segment and the terminal fiber segment may be susceptible to weakening. It may be desirable for this interface to be covered by the protective element, so as to protect it from damage during cleaning and deposition of the functional coating.

According to one embodiment of the invention, the protective element is a protective coating. The skilled artisan will recognize that there are many materials suitable for use as protective coatings in the present invention. For example, UV- or thermally-cured materials such as optical fiber coatings and recoat formulations may be suitable for use. Alternatively, soluble polymer coatings or waxes may be used, for example, by deposition from solution. Positive photoresist materials may also be suitable for use as the protective coating. It may be desirable for such coatings to have a thickness of at least about 250 nm in order provide sufficient protection from deposition and cleaning conditions.

In one exemplary embodiment of the invention, the protective coating is an optical fiber recoat material, conventionally used by the skilled artisan to protect optical fiber splices. The formation of the protective coating can be performed using a recoat mold, which is conventionally used by the skilled artisan to protect optical fiber splices. The segment of the fiber lens to be coated is clamped in the mold, and the recoat formulation is injected into the recoat mold and cured. In one embodiment of the invention, the protective coating is applied and cured using a commercial fiber recoating apparatus (e.g., from Vytran Corporation). Use of a standard recoating process allows the protective coating to be formed evenly, and can provide more consistent pull strengths. When using a commercial recoating apparatus, the protective coating may be initially formed so as to cover the optically operative area. The protective coating can then be removed from the neighborhood of the optically operative area (e.g., by using a fiber stripper, such as a Miller stripper). It may be desirable to remove no more than about 1 mm of the protective coating from the end of the lensed fiber. In certain desirable embodiments of the invention, no more than about 650 µm of the protective coating is removed.

Figure 9:
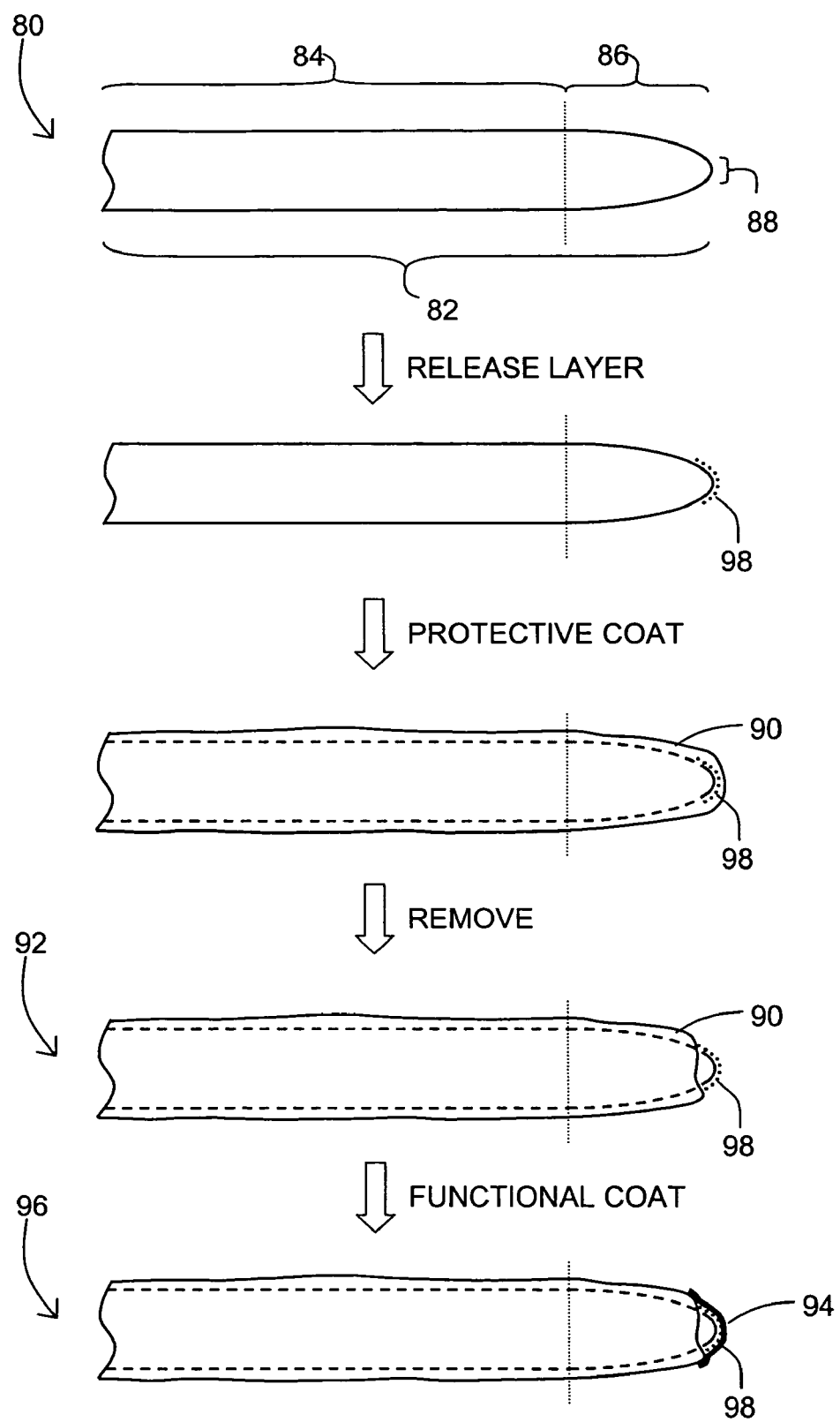
FIG. 9 is a schematic view of an example of a method of the present invention.

In order to ensure that the optically operative area of the lensed segment is not covered by the protective coating, it may be desirable to coat the optically operative area of the lensed segment with a release layer before forming the protective coating on the terminal section of the lensed fiber, as shown in schematic view in FIG. 9. A lensed fiber 80 is provided. Lensed fiber 80 has a terminal section 82, which includes terminal fiber segment 84 and lensed segment 86, which has an optically operative area 88. A thin release layer 98 is formed on optically operative area 88. The release layer 98 can be, for example, an alkyl or fluorinated alkyl organically-modified silicate material, such as is described in U.S. Pat. No. 6,733,824, which is hereby incorporated herein by reference in its entirety. For example, 1H,1H,2H,2H-tridecafluorooctyltrimethoxysilane or octadecyltrimethoxysilane can be used to create an organically-modified silicate release layer. At least part of terminal section 82 of lensed fiber 80 is coated with a protective coating 90. If the optically operative area 88 is coated with the protective coating 90, as shown in FIG. 9, the release layer 98 will allow the skilled artisan to remove it from the optically operative area, thereby forming protected lensed fiber 92. The release layer can also reduce the surface energy of the optically operative area, thereby helping to prevent contamination, and allowing the optically operative area to be effectively cleaned before formation of the functional coating, enabling the formation of very high-quality functional coatings. Desirably, the protective coating is selected so that it tears easily enough that it can be removed from the optically active area without damaging the protective coating on the terminal section of the lensed fiber. Functional coating 94 is formed on the now uncoated optically operative area 88 of lensed segment 86, thereby forming the functional-coated lensed fiber 96. Desirably, the release layer is thin enough not to substantially effect the operation of the functionally-coated lensed fiber. The release layer may also be removed prior to the formation of the functional coating. For example, the plasma cleaning step typically performed immediately before the deposition of typical AR coatings will remove a thin organically-modified silicate release layer.

Organically modified silicates may also be useful as protective coatings in the present invention. For example, a thin layer of organically modified silicate protective coating may be formed using techniques described in "Metal-Organics for Materials & Polymer Technology," a 2001 supplement to the Gelest General Catalog, which is available from Gelest, Inc. (Tullytown, Pa.), and is hereby incorporated herein by reference.

The protective element may alternatively be a ceramic or glass ferrule positioned over at least part of the terminal section of the lensed fiber. The ferrule can be attached to the terminal section of the lensed fiber using methods familiar to the skilled artisan, including glass fusion, glass frit or adhesives. Use of a ferrule as the protective element can be additionally advantageous, because it can provide added stability and give the user of the lensed fiber a known dimension and convenient way to fixture the lensed fiber in a system. The skilled artisan will recognize that the protective element of the present invention can take many forms other than those described specifically herein. For example, the protective element may be formed using a heat-shrink material.

Functional coatings are coatings deposited on the optically operative areas of lensed fibers to perform some desired function (e.g., an optical function). One especially desirable example of a functional coating is an antireflection coating (e.g., formed from alternating layers of high- and low-index dielectrics). Other examples of functional coatings include reflective coatings and partially reflective coatings (e.g., thin layers of silver); chemically sensitive coatings (e.g., change optical properties with interaction with chemicals); phase retarding coatings (e.g., a thin layer of dielectric); optically filtering coatings (e.g., formed from alternating layers of high- and low-index dielectrics); and polarizing coatings (e.g., as described in U.S. Provisional Patent Application 60/437,253, which is hereby incorporated herein by reference in its entirety). Desirably, the functional coatings are formed to be relatively thin (e.g., less than about 25 microns in thickness, more desirably less than about 7 microns in thickness, even more desirably less than about 2 microns in thickness).

The functional coating may be formed using a variety of methods familiar to the skilled artisan. For example, e-beam deposition, chemical vapor deposition, sputtering or evaporation methods may be used to form the functional coating. The protective element is desirably chosen to be substantially stable to the conditions of the formation of the functional coating.

In order to simplify later assembly steps, it may be desirable to remove the protective element from the functional-coated lensed fiber. For example, the removal of the protective element may be necessary to fit the functional-coated lensed fiber into a standard optical fiber ferrule. The skilled artisan will select a removal method appropriate for the particular protective element being used. For example, soluble polymers and waxes may be removed by dissolution in an appropriate solvent. Appropriate chemical removal techniques may also be used. For example, positive photoresist materials may be removed by exposure and development. Cured or insoluble materials (especially optical fiber coating materials) may be removed using physical removal methods (e.g., standard optical fiber stripping techniques). When using physical removal methods, it is desirable that the diameter of the lensed segment is not substantially greater than the diameter of the terminal fiber segment. Physical removal methods are especially useful when the lensed segment is shaped as a taper, a bullet, or a bowling pin. When it is desired to remove a protective element from the functional-coated optical fiber, it may be desirable to coat the terminal section of the lensed fiber with a release coating, similar to those described above, before covering with the protective element, to reduce the strength of the adhesion of the protective element to the terminal section of the lensed fiber and thereby ease removal.

The methods of the present invention can be used to produce functional-coated lensed fibers having relatively low susceptibility to breakage. For example, the methods of the present invention can be used to produce functional-coated lensed fibers having an average pull strength of greater than 40 kpsi. Desirably, the functional-coated lensed fibers made using the methods of the present invention have an average pull strength of greater than 55 kpsi. More desirably, the functional-coated lensed fibers made using the methods of the present invention have an average pull strength of greater than 70 kpsi. In certain embodiments of the invention, these high pull strength lensed fibers have an interface between the lensed segment and the terminal fiber segment. The pull strength test is performed as described below in the Example, below. Reported values are the average of at least three measurements.

Another embodiment of the invention relates to a functional-coated lensed fiber having an optically operative area, the optically operative area having an antireflection coating formed thereon, the functional-coated lensed fiber having an average pull strength of greater than 40 kpsi. In certain embodiments of the invention, these high pull strength lensed fibers have an interface between the lensed segment and the terminal fiber segment.

Another embodiment of the invention relates to a functional-coated lensed fiber having a terminal section including a terminal fiber segment and a lensed segment, the lensed segment having an optically operative area, the optically operative area having an functional coating formed thereon. At least part of the terminal section of the functional-coated lensed fiber is coated with a protective element, but the optically operative area of the lensed segment is not coated by the protective element. Desirably, the protective element is a protective coating.

The functional coating of the functional-coated lensed fibers of the present invention is desirably an antireflection coating. The functional-coated lensed fibers of the present invention desirably have an average pull strength of greater than 55 kpsi. More desirably, the functional-coated lensed fibers have an average pull strength of greater than 70 kpsi. In certain embodiments of the invention, these high pull strength lensed fibers have an interface between the lensed segment and the terminal fiber segment. For example, the lensed segment of the functional-coated lensed fibers of the present invention may formed by splicing material onto the terminal fiber segment. The interface is desirably covered by the protective element. The lensed fibers of the present invention may be made using the methods described hereinabove.

EXAMPLE

The present invention is further described by the following non-limiting example.

Example

Tapered lensed fibers having a "bullet" lens shape and a lensed segment having a diameter substantially equal to that of the terminal fiber segment (available from Corning Incorporated as OptiFocus™ Lensed Fiber) were used in this Example. Three such lensed fibers were coated with the optical fiber recoat formulation described in Example 1 of U.S. Pat. No. 6,596,394, which is hereby incorporated herein by reference. The coating was applied to the lensed fiber with a lint-free swab up to about 0.5 mm from the lensed tip and UV cured. The protective coated lensed fibers were ultrasonically cleaned in 2.0% MICRO-90 cleaning solution for 60 seconds at 40° C.; in deionized water for 15 seconds at 40° C.; and in isopropanol for 10 seconds at 40° C., then allowed to air-dry. Ultrasonic cleaning was performed in a Cole-Parmer ultrasonic cleaner, model number 8894. Multilayer $SiO_2/HfO_2$ antireflection coatings were deposited on the cleaned, protective coated lensed fibers using a crucible, e-beam deposition process in a vacuum. The protective coating was removed from the antireflection coated lensed fibers by physical removal with an Amherst fiber optic thermal stripper.

The lensed ends of three of the antireflection coated lensed fibers were affixed in ferrules as shown in FIG. 9. A gold plated nickel ferrule 100 (about 0.3 mm long) was attached to the lensed fiber 102 about 0.7 mm from the lensed tip 104 using glass solder 106. Each ferruled antireflection coated lensed fiber was pull strength tested by holding the ferruled end in a chuck, pulling (over a pulley) from the fiber end and measuring the applied load at breakage. The antireflection coated lensed fibers made according to the present invention had pull strengths of 145 kpsi, 73 kpsi and 76 kpsi (average of 98 kpsi). A set of five similar antireflection coated lensed fibers made without the use of a protective coating had pull strengths of 10 kpsi, 28 kpsi, 8 kpsi, 36 kpsi and 16 kpsi (average of 20 kpsi).

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A method of making a functional-coated lensed fiber, the method comprising the steps of:

providing a lensed fiber, the lensed fiber having a terminal section including a terminal fiber segment and a lensed segment, the lensed segment having an optically operative area;

covering at least part of the terminal section of the lensed fiber with a protective element, thereby forming a protected lensed fiber having an optically operative area that is not covered by the protective element; and forming a functional coating on the optically operative area of the lensed segment of the protected lensed fiber to form the functional-coated lensed fiber;

wherein the step of covering at least part of the terminal section of the lensed fiber is performed substantially immediately after formation of the lensed fiber.

2. The method of claim 1 wherein the functional-coated lensed fiber has an average pull strength of greater than 55 kpsi.

3. The method of claim 1, wherein the functional coating is an antireflection coating.

4. The method of claim 1, wherein the protective element extends to within about 2 mm of the lensed tip of the lensed fiber.

5. The method of claim 1 further comprising, before the step of forming the functional coating, the step of cleaning at least the optically operative area of the lensed segment of the protected lensed fiber.

6. The method of claim 1, wherein the overspray from the functional coating step lands on the protective element.

7. The method of claim 1, wherein there is an interface between the lensed segment and the terminal fiber segment, and the protective coating covers the interface between the terminal fiber segment and the lensed segment.

8. The method of claim 1, wherein the protective element is a protective coating.

9. The method of claim 8, wherein the protective coating is selected from the group consisting of UV or thermally cured polymers, soluble polymers, waxes, positive photoresists, and organically modified silicates.

10. The method of claim 8, wherein the protective coating is a fiber recoat material formed in a recoat mold.

11. The method of claim 8 further comprising, before the step of covering at least part of the terminal section of the lensed fiber with a protective coating, the step of coating the optically operative area of the lensed segment with a release coating.

12. The method of claim 1, wherein the protective element is a glass or ceramic ferrule.

13. The method of claim 1, wherein the protective element is formed from a heat shrink material.

14. The method of claim 1, wherein the functional coating is formed using a method selected from the group consisting of e-beam deposition, chemical vapor deposition, sputtering or evaporation.

15. The method of claim 1 further comprising the step of removing the protective element from the functional-coated lensed fiber.

16. The method of claim 15, further comprising, before the step of covering the at least part of the terminal section of the lensed fiber with the protective element, the step of coating at least part of the terminal section of the lensed fiber with a release coating.

17. The method of claim 1 wherein the diameter of the lensed segment is not substantially greater than the diameter of the terminal fiber segment.

18. The method of claim 1 wherein the functional-coated lensed fiber has an average pull strength of greater than 40 kpsi.

* * * * *